US010294332B2

(12) United States Patent
Sivasubramanian et al.

(10) Patent No.: US 10,294,332 B2
(45) Date of Patent: May 21, 2019

(54) FUNCTIONALIZED SILOXANE MATERIALS

(71) Applicant: Momentive Performance Materials Inc., Waterford, NY (US)

(72) Inventors: Karthikeyan Sivasubramanian, Bangalore (IN); Vivek Khare, Bangalore (IN)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 0 days.

(21) Appl. No.: 15/538,216

(22) PCT Filed: Dec. 29, 2015

(86) PCT No.: PCT/US2015/067864
§ 371 (c)(1),
(2) Date: Jun. 21, 2017

(87) PCT Pub. No.: WO2016/109537
PCT Pub. Date: Jul. 7, 2016

(65) Prior Publication Data
US 2018/0016401 A1 Jan. 18, 2018

Related U.S. Application Data

(60) Provisional application No. 62/097,856, filed on Dec. 30, 2014.

(51) Int. Cl.
C08G 77/26 (2006.01)
C08G 77/388 (2006.01)
C08G 77/00 (2006.01)
C09K 11/06 (2006.01)

(52) U.S. Cl.
CPC .......... C08G 77/388 (2013.01); C08G 77/26 (2013.01); C08G 77/80 (2013.01); C09K 11/06 (2013.01); C09K 2211/1466 (2013.01); C09K 2211/182 (2013.01)

(58) Field of Classification Search
CPC ...... C08G 77/388; C08G 77/26; C08G 77/80; C09K 11/06; C09K 2211/1466; C09K 2211/182
USPC ....................................... 428/405
See application file for complete search history.

(56) References Cited

U.S. PATENT DOCUMENTS

| 651,758 | A | 6/1900 | Heumader |
| 2,950,986 | A | 8/1960 | Bailey et al. |
| 3,427,273 | A | 2/1969 | Newing et al. |
| 3,741,932 | A | 6/1973 | Smith |
| 4,746,751 | A | 5/1988 | Oviatt et al. |
| 4,866,152 | A | 9/1989 | Lo |
| 4,936,528 | A | 6/1990 | Butner et al. |
| 6,521,359 | B1 | 2/2003 | Noguchi et al. |
| 6,664,111 | B2 * | 12/2003 | Bentsen ............. G01N 21/6408 422/82.07 |
| 6,984,459 | B1 | 1/2006 | Noguchi et al. |
| 7,919,196 | B2 | 4/2011 | Kim et al. |
| 2002/0058157 | A1 | 5/2002 | Shuji et al. |
| 2002/0076577 | A1 | 6/2002 | Noguchi et al. |
| 2002/0122899 | A1 | 9/2002 | Doi et al. |
| 2005/0033053 | A1 | 2/2005 | Lee et al. |
| 2005/0067955 | A1 | 3/2005 | Cho et al. |
| 2005/0109976 | A1 | 5/2005 | Fuchs et al. |
| 2005/0214479 | A1 | 9/2005 | Erben et al. |
| 2007/0029565 | A1 | 2/2007 | Masuda et al. |
| 2007/0052342 | A1 | 3/2007 | Masuda |
| 2007/0218289 | A1 | 9/2007 | Ando |
| 2008/0191202 | A1 | 8/2008 | Hobara |
| 2008/0220265 | A1 * | 9/2008 | Xia ..................... H01L 51/0025 428/447 |
| 2008/0252363 | A1 | 10/2008 | Osame |
| 2008/0303421 | A1 | 12/2008 | Xu et al. |
| 2010/0140603 | A1 | 6/2010 | Jeong et al. |
| 2011/0020413 | A1 | 1/2011 | Gormley |
| 2011/0248250 | A1 | 10/2011 | D'Andrade et al. |

FOREIGN PATENT DOCUMENTS

| EP | 455384 B1 | 1/1995 |
| EP | 1696708 A1 | 8/2006 |
| EP | 1962354 A1 | 8/2008 |
| EP | 2001064 A1 | 12/2008 |
| EP | 1731548 B1 | 11/2009 |
| EP | 2305772 A1 | 4/2011 |
| JP | 2011-093854 A | 5/2011 |
| WO | 2005001874 A1 | 1/2005 |

(Continued)

OTHER PUBLICATIONS

Zhang et al., "Preparation and Luminescence of Europium(III) terpiridine complex-gridged polysilsesquioxanes", Journal of Materials Chemistry, Oct. 20, 2011, vol. 21, p. 18462-18466.*

Zhang et al., "Preparation and luminescence of europium(III) terpyridine complex-bridged polysilsesquioxanes." Journal of Materials Chemistry. vol. 21. 2011. pp. 18462-18466.

Patent Cooperation Treaty (PCT), International Search Report and Written Opinion for Application PCT/US2015/067864 filed Dec. 29, 2015, dated Mar. 16, 2016, International Searching Authority, US.

(Continued)

Primary Examiner — Leszek B Kiliman
(74) Attorney, Agent, or Firm — James Abruzzo; McDonald Hopkins LLC

(57) ABSTRACT

A functionalized siloxane network. The functionalized network comprises a ligand attached to the network. The ligand includes a pyridine-containing compound, and in one embodiment, the ligand includes a terpyridine compound. The functionalized siloxane network can be siloxane particles. The functionalized siloxane network can coordinate metal ions and can be used in luminescent articles.

12 Claims, No Drawings

(56) References Cited

FOREIGN PATENT DOCUMENTS

| WO | 2005019309 A1 | 3/2005 |
| WO | 2005035632 A1 | 4/2005 |
| WO | 2007146548 A1 | 12/2007 |

OTHER PUBLICATIONS

Tong et al., "Novel luminescent lanthanide complexes covalently linked to a terpyridine-functionalized silica network." Journal of Photochemistry and Photobiology. vol. 191, No. 1. 2007. pp. 74-79.
Huanrong Li et al., "Construction and Photoluminescence of Monophase Hybrid Materials Derived from a Urea-Based Bis-Silylated Bipyridine." European Journal of inorganic Chemistry. vol. 2009, No. 4. 2009. pp. 519-523.

\* cited by examiner

FUNCTIONALIZED SILOXANE MATERIALS

CROSS-REFERENCE TO RELATED APPLICATIONS

The present application claims priority to and the benefit of International Patent Application No. PCT/US2015/067864 filed on Dec. 29, 2015, which claims priority to and the benefit of U.S. Provisional Application No. 62/097,856 filed on Dec. 30, 2014, the disclosure each of which is incorporated herein by reference in its entirety.

FIELD

The disclosed subject matter relates to functionalized siloxane materials. In particular, the subject matter relates to a siloxane network functionalized with a ligand capable of binding a metal. The functionalized siloxane network can be used in a variety of applications such as, but not limited to binding metals that are capable of phosphorescing upon exposure to UV irradiation.

BACKGROUND

Lighting and display markets are undergoing rapid revolution led by innovation in light emitting diodes (LED) technologies. LEDs are solid state electronic materials made up of either inorganic materials (see e.g., C. Feldmann, T. Justell, C. R. Ronda and P. J. Schmidt, Adv. Funct. Mater. Vol 13, No. 7, 2003) and semiconductors, or organic (see e.g., The Electronic and Optical Properties of Amorphous Organic Semiconductors, M. E. Baldo, Ph.D. Thesis, Princeton University, 2001), or polymeric (see e.g., Polymer OLED technologies, Presentations from Cambridge Display Technologies (CDT)-Sumitomo Chemical Co., T. Yamada, Y. Tsubata, C. Sekine, T. Ohnishi, 2008, and I. Bidd, 2010) chemical entities. Actual requirements for these materials depend on the nature of the end application (display vs. lighting), but overall they provide many key benefits over existing materials, such as, for example, long device lifetimes, higher energy efficiency, low voltage of operation, better color rendering, and/or faster switching times.

Organic semiconductors have many unique advantages over inorganic LED materials such as crystalline semiconductor materials. Organic semiconductors have high absorption coefficients in the visible range, which offers the possibility to prepare very thin and flexible devices. A large number of molecules emit red shifted to their absorption, which reduces reabsorption losses in organic light emitting diodes (OLEDs). Organic semiconductors also have low indices of refraction that can ease light extraction issues, which is a key problem of inorganic LED materials (see e.g., R. Meerheim, K. Walzer, G. He, M. Pfeiffer and K. Leo, Organic Optoelectronics and Photonics II, edited by Paul L. Heremans, Michelle Muccini, Eric A. Meulenkamp, Proc. Of SPIE Vol. 6192, 61920P, (2006)). The organic LED materials emit light based on the phenomenon of fluorescence and phosphorescence. The phosphorescent OLED materials may play a larger role in improving the efficiency of light extraction of these LED devices because it is understood that phosphorescence may increase the efficiency by a factor of 4 over that obtained from fluorescence (see e.g. M. A. Baldo, M. E. Thompson and S. R. Forrest, Pure Appl. Chem., Vol. 71, No. 11, pp. 2095-2106, 1999; S. Kappaun, C. Slugovc and E. J. W. List, Int. J. Mol. Sci, 9, 1527-1547 2008). The organo-transition metal complexes are generally preferred over purely organic emitter materials because they enable this enhancement of the efficiency of the light-emitting devices via phosphorescence (see e.g., H. Yersin and W. J. Finkenzeller, Highly Efficient OLEDs with Phosphorescent Materials. Edited by H. Yersin, WILEY-VCH Verlag GmbH & Co. KGaA, Weinheim, 2008). The organo-metallic complexes also offer benefit in terms of low power consumption.

Generation of white light is required for substitution of existing lighting infrastructure with the LEDs. In order to generate white light, multiple strategies are used such as (a) combining individual RGB color phosphors, or (b) using a blue or UV LED with multiple phosphors generating a broad spectrum of white light. The latter approach is considered a simpler and a cheaper way to build a LED for generating white light.

SUMMARY

The present subject matter provides functionalized siloxane materials comprising a ligand that is capable of binding or complexing a metal or metal salts. The functionalized siloxanes can be used to bind metal atoms such as, for example, lanthanide metals that are capable of phosphorescing when exposed to irradiation.

In one aspect, the present subject matter provides a functionalized siloxane network comprising a pyridine-containing ligand attached to the network. In one embodiment, the pyridine-containing ligand is chosen from a substituted or unsubstituted bidentate pyridine compound, a substituted or unsubstituted tridentate pyridine compound, or a combination of two or more thereof. In one embodiment, the pyridine-containing ligand is a terpyridine ligand.

In one embodiment, the functionalized siloxane network comprises a terpyridine ligand comprising a functional group suitable for attaching to the siloxane network. In one embodiment, the pyridine-containing ligand is attached to the siloxane network through an oxygen atom or a silicon atom. In one embodiment, the pyridine-containing ligand is attached to the siloxane network through a linking group derived from an alcohol functional group or an alkoxysilyl functional group.

In another embodiment, the pyridine-containing ligand is derived from a compound of the formula:

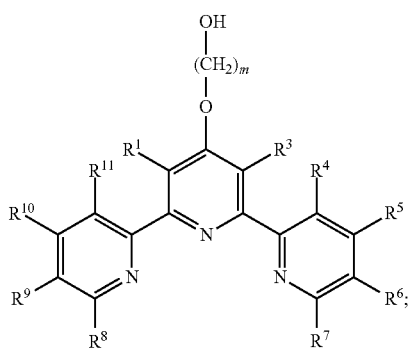

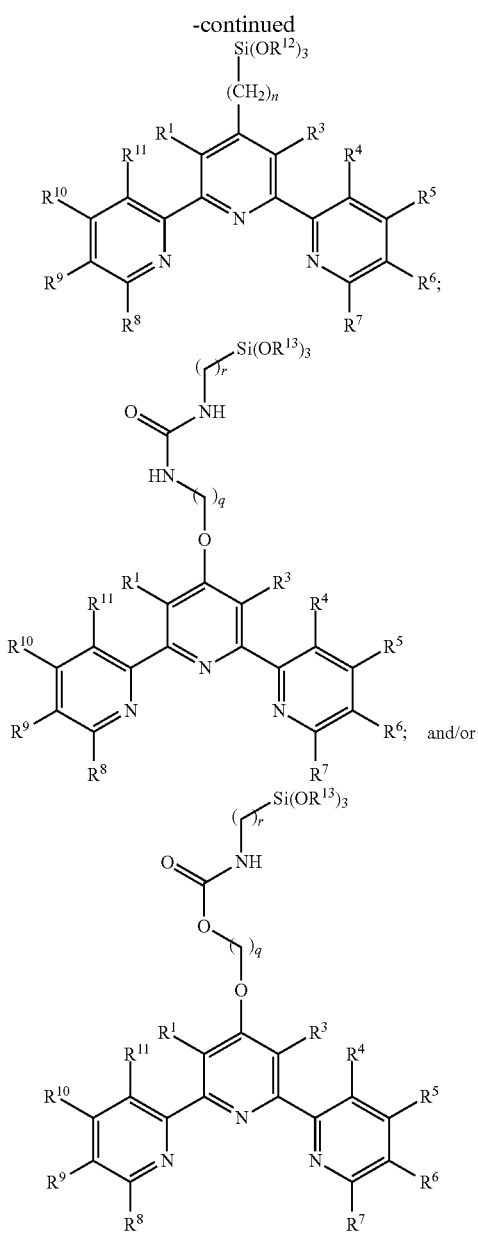

where $R^1$-$R^{11}$ are independently chosen from an alkyl, a substituted alkyl, an aryl, a substituted aryl, an inert functional group, an alkoxysilyl functional group, and an alcohol functional group, optionally any two of $R^1$-$R^{11}$ vicinal to one another, $R^1/R^{11}$ and/or $R^3/R^4$ taken together may form a ring being a substituted or unsubstituted, saturated, or unsaturated cyclic structure, with the proviso that the compound comprises an alkoxysilyl functional group, an alcohol functional group, or a combination of two or more thereof.

In one embodiment, the present invention provides a functionalized siloxane network according to any previous embodiment, wherein the siloxane network comprises a polyorgano silsesquioxane. In one embodiment, the present invention provides a functionalized siloxane network according to any previous embodiment, wherein the polyorgano silsesquioxane is in the form of siloxane particles.

In one embodiment, the present invention provides a functionalized siloxane network according to any previous embodiment, wherein the siloxane particles have an average particle size of from about 0.5 microns to about 12 microns.

In another aspect, the present invention provides a luminophoric material comprising the functionalized siloxane network according to any of the previous embodiments, and a metal or metal salt coordinated by the terpyridine ligand. In one embodiment, the metal or metal salt comprises a metal chosen from europium, erbium, cerium, neodymium, samarium, terbium, dysprosium, gadolinium, holmium, thulium, ytterbium, lutetium, or a combination of two or more thereof. In one embodiment, the metal salt comprises europium nitrate.

In still another aspect, the present invention provides an article comprising the luminophoric material according to any of the previous embodiments.

In one embodiment, the luminophoric material is provided as a coating layer on at least a portion of a surface of the article or surface of an organic or inorganic coating or as an additive into an organic or inorganic coating composition.

In one embodiment, the article comprises a plurality of layers, and at least one layer comprises the luminophoric material.

In one embodiment, the siloxane network is in the form of siloxane particles.

These and other aspects and embodiments of the present technology are further understood and described with reference to the following detailed description.

DETAILED DESCRIPTION

The present subject matter provides a functionalized siloxane network comprising a ligand attached thereto. The ligand is capable of binding a metal such as a metal ion or salt or compound of metal. In one aspect, functionalized siloxane can be used to bind metals or metal salts that are capable of phosphorescing and producing a particular color of light upon exposure to UV irradiation.

As used herein, the term "alkyl" includes straight, branched and cyclic alkyl groups. Specific and non-limiting examples of alkyls include, but are not limited to, methyl, ethyl, propyl, isobutyl, cyclohexyl, etc.

As used herein, the term "substituted alkyl" includes an alkyl group that contains one or more substituent groups that are inert under the process conditions to which the compound containing these groups is subjected. Suitable substituents can include, but are not limited to alkyl, aryl, alkenyl, alkynyl, etc. The substituent groups also do not substantially or deleteriously interfere with the process.

As used herein, the term "aryl" refers to a non-limiting group of any aromatic hydrocarbon from which one hydrogen atom has been removed. An aryl may have one or more aromatic rings, which may be fused, connected by single bonds or other groups. Examples of suitable aryls include, but are not limited to, tolyl, xylyl, phenyl, naphthalenyl, etc.

As used herein, the term "substituted aryl" refers to an aromatic group substituted as set forth in the above definition of "substituted alkyl." Similar to an aryl, a substituted aryl may have one or more aromatic rings, which may be fused, connected by single bonds or other groups. When the substituted aryl has a heteroaromatic ring, the attachment can be through a heteroatom (such as nitrogen) of the heteroaromatic ring instead of a carbon. In one embodiment, the substituted aryl groups herein contain 1 to about 30 carbon atoms.

As used herein, the term "alkenyl" refers to any straight, branched, or cyclic alkenyl group containing one or more carbon-carbon double bonds, where the point of substitution can be either a carbon-carbon double bond or elsewhere in the group. Examples of suitable alkenyls include, but are not limited to, vinyl, propenyl, allyl, methallyl, ethylidenyl norbornyl, etc.

As used herein, the term "alkynyl" refers to any straight, branched, or cyclic alkynyl group containing one or more carbon-carbon triple bonds, where the point of substitution can be either at a carbon-carbon triple bond or elsewhere in the group.

As used herein, the term "unsaturated" refers to one or more double or triple bonds. In one embodiment, it refers to carbon-carbon double or triple bonds.

As used herein, the term "inert substituent" refers to a group other than hydrocarbyl or substituted hydrocarbyl, which is inert under the process conditions to which the compound containing the group is subjected. The inert substituents also do not substantially or deleteriously interfere with any process described herein that the compound in which they are present may take part in. Examples of inert substituents include, but are not limited to, halo (fluoro, chloro, bromo, and iodo), and ether such as —OR wherein R is hydrocarbyl or substituted hydrocarbyl.

As used herein, the term "hetero atoms" refers to any of the Group 13-17 elements except carbon, and can include, for example, oxygen, nitrogen, silicon, sulfur, phosphorus, fluorine, chlorine, bromine, and iodine.

The functionalized siloxane network comprises a siloxane network comprising a ligand attached thereto. The ligand comprises a pyridine-containing compound. The ligand may be chosen from a substituted or unsubstituted bidentate pyridine compound, a substituted or unsubstituted tridentate pyridine compound, or combinations of two or more thereof. The ligand is functionalized to allow for attachment of the ligand to or incorporation into the siloxane network.

In one embodiment, the ligand comprises a terpyridine compound of the Formula (I):

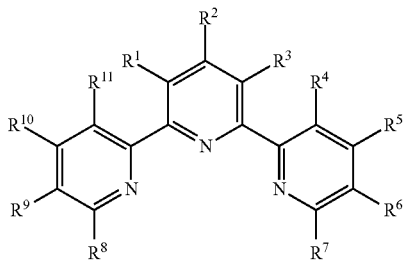

where $R^1$-$R^{11}$ are independently chosen from an alkyl, a substituted alkyl, an aryl, a substituted aryl, an inert functional group, an alkoxysilyl functional group, and an alcohol functional group, optionally any two of $R^1$-$R^{11}$ vicinal to one another, $R^1/R^{11}$ and/or $R^3/R^4$ taken together may form a ring being a substituted or unsubstituted, saturated, or unsaturated cyclic structure, with the proviso that the compound comprises an alkoxysilyl functional group, an alcohol functional group, or a combination of two or more thereof.

In embodiments, the pyridine-containing ligand is a substituted pyridine complex comprising at least one alkoxysilyl functional group, at least one alcohol function group, or a combination of two or more thereof as an "R" substituent on the pyridine compound. In one embodiment, the remaining groups for $R^1$-$R^{11}$ may be independently chosen from hydrogen, a C1-C18 alkyl, a C1-C18 substituted alkyl, a C6-C18 aryl, and a substituted C6-C18 aryl.

The alkoxysilyl functional group and/or the alcohol functional group are employed to attach the pyridine-containing ligand to the siloxane network. In one embodiment, the alcohol functional group is chosen from a compound of the formula —O—$(CH^2)_m$—OH where m is 1-20.

In one embodiment, the alkoxysilyl functional group is chosen from a functional group of the formula: —$(CH_2)_n$—Si$(OR^{12})_3$, where $R^{12}$ is $C_pH_{2p+1}$, p is 1-10, and n is 1-20. In another embodiment, the alkoxysilyl functional group is chosen from a functional group of the formula: —O—$(CH_2)_q$-$A^1$-C(O)-$A^2$-$(CH_2)_r$—Si$(OR^{13})_3$, where $A^1$ and $A^2$ are independently chosen from an oxygen atom or NH, q and r are independently 1-20, and $R^{13}$ is $C_pH_{2p+1}$ where p is 1-10. In one embodiment, $A^1$ and $A^2$ are each chosen from NH. In one embodiment, $A^1$ is O, and $A^2$ is NH. In one embodiment, $A^1$ and $A^2$ are each O.

The alkoxysilyl and/or alcohol functional group can be provided at any of the $R^1$-$R^{11}$ positions on the terpyridine compound. In one embodiment, the terpyridine compound comprises an alkoxysilyl or alcohol functional group at the $R^2$ position.

Examples of suitable ligands include, but are not limited to, ligands of the Formulas (II)-(V):

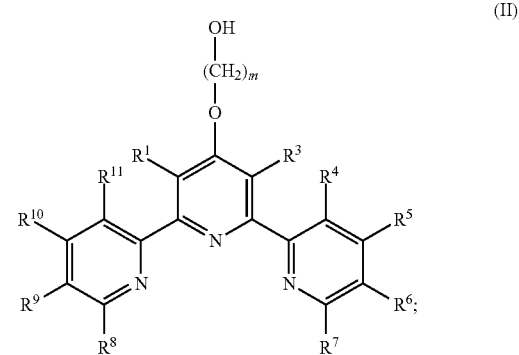

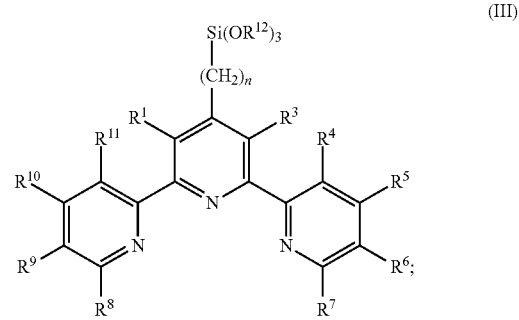

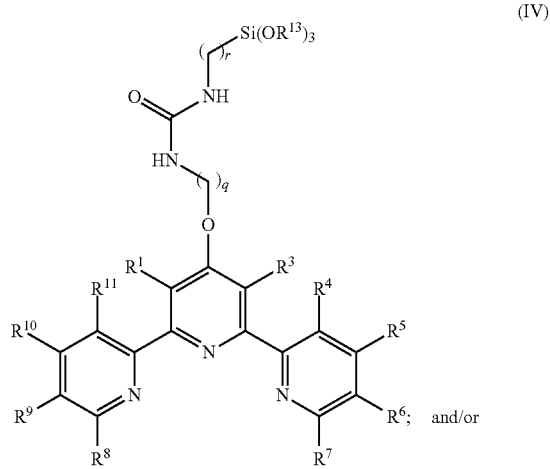

and/or

-continued

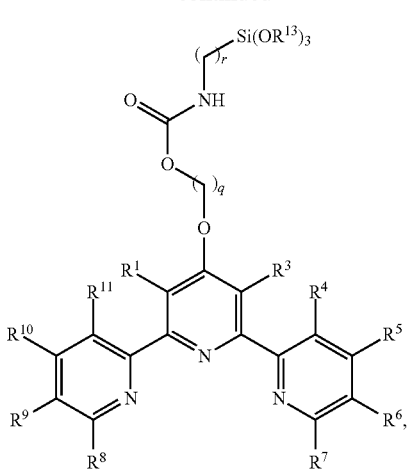

(V)

where $R^1$ and $R^3$-$R^{13}$ can be as described above.

The functionalized terpyridines comprising an alkoxysilyl and/or alcohol functional group can be synthesized by any suitable method for attaching such groups to the cyclic structure of a pyridine group. In one embodiment, an alcohol functional group or an alkoxysilyl-containing functional group can be attached to a pyridine of the ligand by the condensation reaction of a diol or amino diol with a halogen substituted pyridine-containing compound (e.g., terpyridine). In one embodiment, an alkoxysilyl group can be attached to a pyridine unit by the hydrosilylation reaction between a silane hydride or siloxane hydride with an alkenyl functional pyridine-containing compound.

In embodiments, the pyridine-containing ligand may be a substituted or unsubstituted bidentate pyridine compound. Examples of suitable bidentate pyridine compounds include, but are not limited to, 2,2' bipyridine, 3,3' bipyridine, etc. It will be appreciated that the bidentate pyridine compound may be substituted as described with respect to the tridentate pyridine-containing ligands. That is, the groups attached to the pyridine rings may be selected from the groups described with respect to $R^1$-$R^{11}$ for the terpyridine ligands. In embodiments, the bidentate pyridine compounds may be a substituted bidentate pyridine ligand comprising an alkoxysilyl functional group, an alcohol functional group, or a combination of two or more thereof.

While the above complexes have been described with respect to pyridine-containing compounds as the ligand L, it will be appreciated that one or more nitrogen atoms could be replaced with a heteroatom such as O, P or a combination thereof.

The siloxane network to which the ligand is attached is not particularly limited and can be chosen as desired for a particular purpose or intended application. In one embodiment, the siloxane network comprises a silicon ladder resin, i.e., an organopolysiloxane having a ladder-like molecular structure, which is sometimes referred to as a polyorgano silsesquioxane having a cage-like or double-ring structure.

Polyorgano silsesquioxanes can be represented by the formula $(R^{14}SiO_{3/2})_t$ where t is an even integer from 2 to 100, and $R^{14}$ is independently chosen from hydrogen, an aliphatic radical, an aromatic radical, or a cycloaliphatic radical. Suitable aliphatic radicals include, but are not limited to, alkyl groups, alkenyl groups, alkynyl groups, etc. In one embodiment, the aliphatic group is a C1-C18 alkyl group.

Polyorgano silsesquioxanes can be prepared by conventional methods, such as, for example, those disclosed in F. Brown et al., J. Polymer Sci., Part C, No. 1, p. 83 (1983), in such a way that one or more of the trialkoxysilanes are hydrolyzed with an acid catalyst and condensed. Suitable examples of polyorgano silsesquioxane include, but are not limited to, polyalkyl silsesquioxanes, where the alkyl groups can be methyl, C2-C18 alkyl, hydride, phenyl, vinyl, cyclohexyl or any combination of two or more thereof. Examples include polymethyl silsesquioxane, polyphenyl silsesquioxane, polyphenyl-methyl silsesquioxane, a phenyl silsesquioxane-dimethyl siloxane copolymer in liquid form, polyphenyl-vinyl silsesquioxane, polycyclohexyl silsesquioxane, polycyclopentyl silsesquioxane, and polyhydride silsesquioxane.

In one embodiment, the polyorgano silsesquioxane is a polyalkyl siloxane powder material prepared by one of the following: hydrolysis, polymerization, or crosslinking of alkylsilanes or alkylsiloxanes in such a way as to give a defined particulate structure with a surface consisting largely of alkyl-functional silicone atoms.

In yet another embodiment, the silicon ladder resin is a poly(methyl silsesquioxane) obtained by hydrolytic condensation in aqueous ammonia or amines of methyltri-alkoxysilanes, or their hydroxylates or condensates. The silicone resin is obtained as microspheres substantially spherical in shape and form free-flowing powders, which are low in impurities such as chlorine, alkali metals, or alkaline earth metals.

In one embodiment, the silicone microspheres are substantially spherical and have a mean particle diameter of about 0.5 to about 12.0 microns, more preferably about 1.0 to about 3.0 microns. In one embodiment, the polyorgano silsesquioxane has an average particle size of about or less than 4 μm. In a second embodiment, the polyorgano silsesquioxane has an average particle size of about 2 μm or less. Examples of suitable silicone microspheres for include those sold under the trade name Tospearl® available from Momentive Performance Materials Inc.

The ligand may be attached to the siloxane network by any suitable method. Siloxane networks can be formed, for example, by hydrolysis of an alkyl trialkoxy silane (e.g., methyl trimethoxy silane) and condensation in the presence of an acid and base. In one embodiment, the functionalized ligand can be added during hydrolysis of the silane followed by careful condensation in the presence of an acid and base. Following the reaction, particles can be filtered out, dried, and lightly grinded to provide functionalized, optionally spherical particles.

The functionalized siloxane particles can be employed to complex or coordinate a metal ion or metal salt. The metal can be selected as desired for a particular purpose or intended application. In one embodiment, the ligand functionalized siloxane particles can be complexed with a lanthanide series metal, a salt thereof, or a combination of two or more thereof. Suitable metals include, but are not limited to, yttrium, lanthanum, praseodymium, promethium, europium, erbium, cerium, neodymium, samarium, terbium, dysprosium, gadolinium, holmium, thulium, ytterbium, lutetium, or combinations of two or more thereof. The metal may be provided as a metal salt or complex with a selected ion or complexing agent. The ion for forming the salt is not particularly limited and may be chosen as desired for a particular purpose or intended application. Examples of suitable ions for forming the salts include, but are not limited to, nitrates, nitrites, sulfates, sulfonates, sulfites, phosphates, phosphites, organic sulfates, organic sulfonates, halogens (chloride, fluoride, iodide), etc. In one embodiment, the salt comprises nitrates. An example of a suitable sulfonate is trflilate (trifluoromethane sulfonate). When subjected to UV irradiation, the particles can show a characteristic phosphorescence based on the metal or metals employed. The functionalized siloxane network, such as functionalized siloxane particles, can be tuned to provide a selected color based on the concentration of the metal atoms or by complexing a plurality of metal ions or metal salts and by controlling the concentration of the respective metals complexed by the functionalized particles.

In one embodiment, where the luminophoric material is a pyridine-based complex, the complex can be formed by providing the pyridine-based compound, dissolving the compound in a solvent, and then adding a metal material or suitable metal salt to form the complex. The solvent may be a polar and/or non-polar solvent such as methanol, ethanol, n-butanol, t-butanol, n-octanol, n-decanol, 1-methoxy-2-propanol, isopropyl alcohol, ethylene glycol, hexane, decane, isooctane, benzene, toluene, the xylenes, tetrahydrofuran, dioxane, diethyl ether, dibutyl ether, bis(2-methoxyethyl)ether, 1,2-dimethoxyethane, acetonitrile, benzonitrile, aniline, phenylenediamine, pphenylenediamine, chloroform, acetone, methylethyl ketone, dimethylformamide (DMF), dimethyl sulfoxide (DMSO), N-methylpyrrolidinone (NMP), and propylene carbonate. Then a metal ion or metal salt may be added into the solution comprising of solvent and ligand. The metal ion or salt may be any appropriate metal ion or salt as discussed above. The metal ion or salt may react with the ligand to form a metal complex in the solvent to form a complex solution.

The functionalized siloxane network and metal complexes thereof can be incorporated into a wide variety of materials and employed in a variety of applications including into films, coatings, or polymeric layers for use in lighting or display structures. The instant luminophoric material can form a coating layer on at least a portion of a surface of the article or surface of an organic or inorganic coating or an additive into an organic or inorganic coating composition. Non-limiting examples of suitable applications include LED devices, liquid crystals devices, field emission devices, etc. In one embodiment, the luminophoric material is provided in an amount of from about 0.05 wt. % to about 5 wt. %, from about 0.1 wt. % to about 2.5 wt. %, even from about 0.1 wt. % to about 1 wt. % based on the dry weight of the layer (e.g., coating, film, etc.) comprising such luminophoric materials.

The following examples illustrate embodiments of materials in accordance with the disclosed technology. The examples are intended to illustrate aspects and embodiments of the disclosed technology, and are not intended to limit the claims or disclosure to such specific embodiments.

EXAMPLES

Synthesis of Functionalized Siloxane Particles

A terpyridine based ligand was incorporated into a siloxane network during the hydrolysis of methyl trimethoxy silane (MTMS) followed by condensation in the presence of an acid (HCl) and a base (ammonium hydroxide). The variation of MTMS to water ratio, the catalyst concentration and the reaction time/temperature led to controlled size of the final particles. The trimethoxysilane functionalized terpyridine is used as a precursor to introduce phosphorescence in the particles by co-hydrolyzing & condensing it with MTMS in a desired weight ratio. The terpyridine molecule was added during the hydrolysis stage of the reaction. At the end of the reaction, the formed particles are filtered out, dried, and grinded lightly to obtain smooth, spherical uniform particles with the size ranging from 0.5-12 μm. Larger or smaller nano sized particles can be obtained by appropriately changing the reaction conditions.

Production of Siloxane Particle/Metal Complexes

Complexation with europium nitrate is carried out in the end followed by washing, separation, and drying to obtain particles. These particles under UV irradiation show a characteristic phosphorescent behavior associated with the complexation of terpyridine with Europium.

Example 1: Synthesis of Alcohol Functionalized Terpyridine

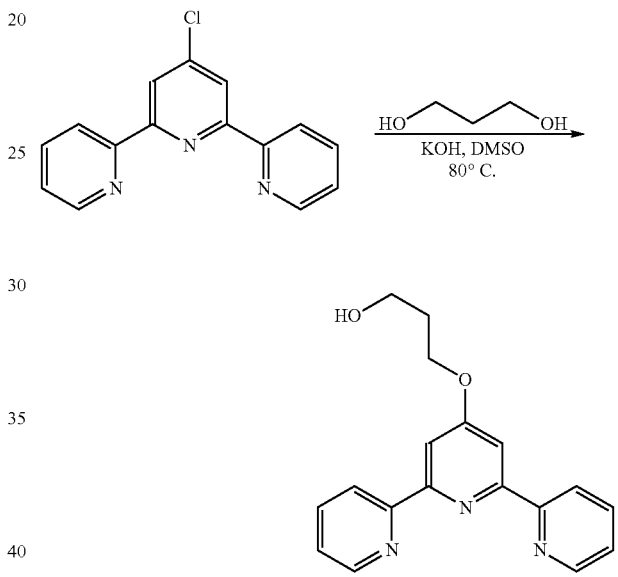

4-Chloro-2,2':6',2''-terpyridine (1.5 gm, 5.62 mmol) was taken along with 1,3 propanediol (4.89 g, 61.82 mmol) and powdered potassium hydroxide (0.63 gm, 11.24 mmol) in dry dimethylsulfoxide (15 ml), heated to 70° C., and kept at that temperature for 24 hours. After 24 hours, the reaction mixture was poured into water. The solid obtained was filtered and dried. NMR confirmed product formation along with the presence of 4-Chloro-2,2':6',2''-terpyridine.

Example 2: Synthesis of Amino Functionalized Terpyridine

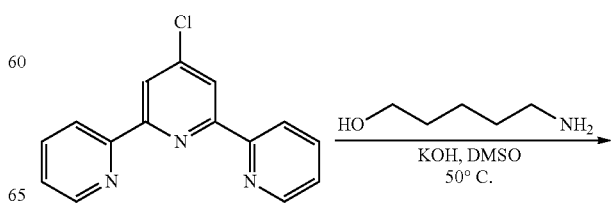

-continued

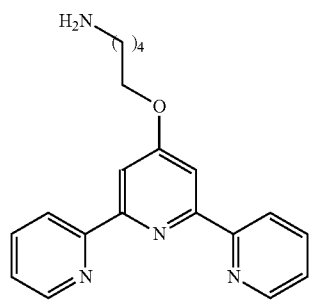

5-amino-1-pentanol (1.96 g, 19.0 mmol) was taken along with potassium hydroxide (0.61 g, 10.89 mmol) and stirred at 50° C. for 30 minutes in dry dimethylsulfoxide. To this, 4-Chloro-2,2':6',2"-terpyridine (1.0 g, 3.74 mmol) was added, and the reaction was conducted at 50° C. for 18 hours. After 18 hours, the reaction mixture was poured into ice cold water leading to the formation of a precipitate that was filtered and washed with water and dried. NMR confirmed the product formation.

Example 3: Synthesis of Trimethoxy Functionalized Terpyridine

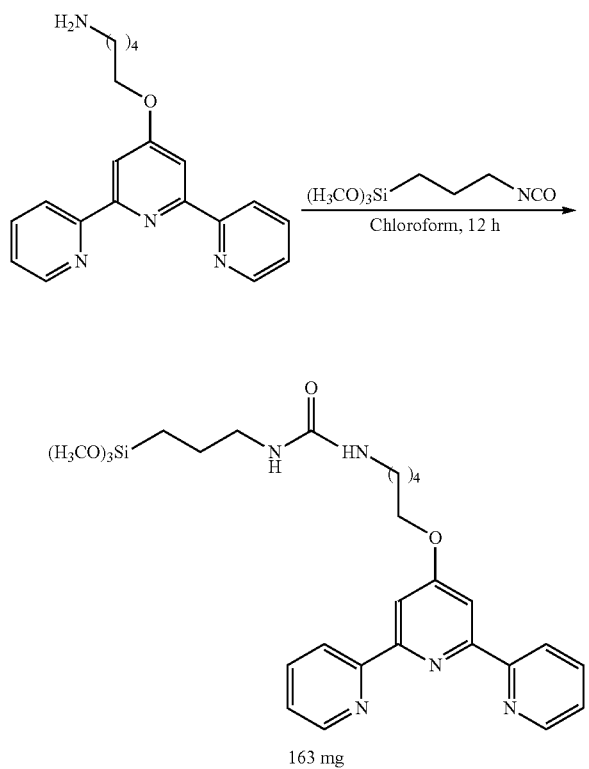

163 mg 163 mg (0.487 mmol) of Amino functionalized terpyridine from Example 2 was taken along with 3-(Trimethoxysilyl)propyl isocyanate (100 mg, 0.487 mmol) in chloroform (10 ml) and stirred at room temperature for 12 hours. After 12 hours of stirring, the solvent was removed and 1H NMR confirmed product formation.

Example 4: Synthesis of Triethoxy Functionalized Terpyridine

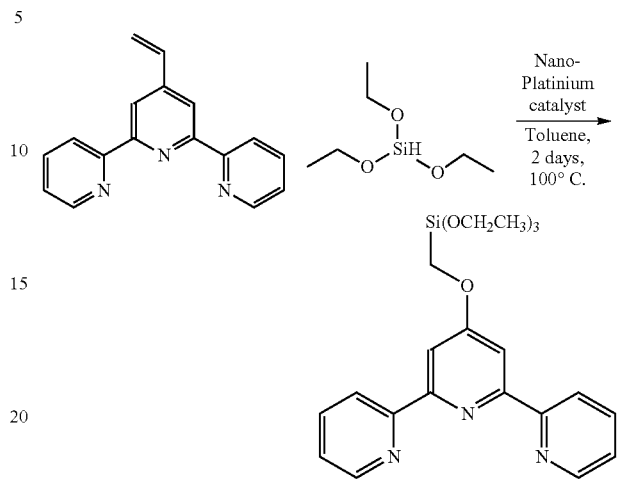

100 mg (0.609 mmol) of triethoxysilane was taken along with vinyl terpyridine (0.157 g, 0.609 mmol) and nano-platinum catalyst (100 mg) in toluene and heated to 100° C. for 2 days. After 2 days, the solution was filtered and evaporated to yield triethoxy functionalized terpyridine.

Example 5: Synthesis of Siloxane Particles 6 grams of MTMS was added drop wise to 36 grams of DI water at 35° C. (acidic with 2.4 gm of $2.5 \times 10^{-4}$ M HCl) and stirred for 1 hour 40 minutes followed by addition of 26 mg of vinyl terpyridine triethoxy silane. The reaction mixture was further stirred at 35° C. for 1 hour 20 minutes. Thereafter the reaction mixture was set to cool to 18° C. for 1 hour 1.6 grams of 0.3 wt % ammonium hydroxide was then added to the reaction mixture and kept under high agitation for 5 minutes. The agitation was then stopped, and the mixture was allowed to condense and settle overnight. The following day, the mixture was washed several times with methanol and vacuum filtered and kept in oven at 50° C. for drying. The dried particles were grinded lightly to obtain smooth, spherical uniform particles with the size in the range of 3-5 µm.

Example 6: Complexation of Functionalized Siloxane Particles with Eu Metal

The terpyridine functionalized siloxane particles were complexed with Europium by stirring the terpyridine functionalized siloxane particles with Europium (III)nitrate pentahydrate in methanol for 30 minutes. After 30 minutes, the solution was filtered, and the siloxane particles were dried. UV illumination of the particles yielded phosphorescence from terpyridine-Eu complex.

Example 7: Synthesis of Siloxane Particles

Synthesis of trimethoxy functionalized terpyridine: 21 ml of MTMS was added drop wise to 120 ml of DI water at 30° C. (acidic with 2.1 ml of about $9.6 \times 10^{-3}$ M HCl). After addition, the temperature was raised to 35° C. and stirred for 1 hours 10 minutes followed by addition of 65 mg of trimethoxy functionalized terpyridine synthesized from Example 3. The reaction mixture was further stirred at 35° C. for 2 hours and 10 minutes, and then at 45° C. for 1 hour. Thereafter, the reaction mixture was set to cool to 18° C. over 40 minutes 5.6 ml of 0.3 wt % ammonium hydroxide was then added to the reaction mixture and kept under high agitation for 3 minutes. The agitation was then stopped and the mixture was allowed to condense and settle overnight. The following day, the mixture was washed several times with methanol and vacuum filtered and kept in oven at 50° C. for 2 hours for drying.

Example 8: Complexation of Functionalized Siloxane Particles with Europium and Terbium Metal The terpyridine functionalized siloxane particles from Example 7 was complexed with Europium and Terbium by stirring the terpyridine functionalized siloxane particles (1 g) with Europium (III)nitrate pentahydrate 100 mg) and Terbium (III)nitrate pentahydrate in methanol for 30 minutes. After 30 minutes, the solution was filtered and the siloxane particles were dried. UV illumination of the particles yielded phosphorescence from terpyridine-Eu complex.

While the above description contains many specifics, these specifics should not be construed as limitations on the scope of the invention, but merely as exemplifications of preferred embodiments thereof. Those skilled in the art may envision many other possible variations that are within the scope and spirit of the invention as defined by the claims appended hereto.

What is claimed is:

1. A functionalized siloxane network comprising a siloxane network and a pyridine-containing ligand attached to the siloxane network, wherein the pyridine-containing ligand is a terpyridine compound of the formula and the terpyridine is derived from a compound of the formula:

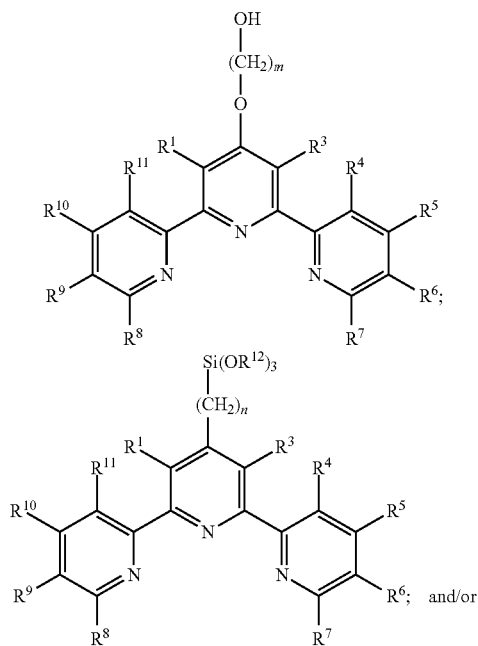

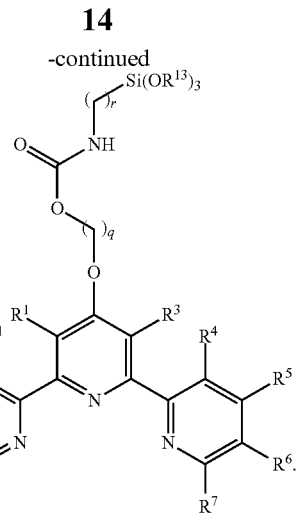

where $R^1$-$R^{11}$ are independently chosen from an alkyl, a substituted alkyl, an aryl, a substituted aryl, an inert functional group, an alkoxysilyl functional group, and an alcohol functional group, optionally any two of $R^1$-$R^{11}$ vicinal to one another, $R^1/R^{11}$ and/or $R^3/R^4$ taken together may form a ring being a substituted or unsubstituted, saturated, or unsaturated cyclic structure, with the proviso that the compound comprises an alkoxysilyl functional group, an alcohol functional group, or a combination of two or more thereof;
$R^{12}$ and $R^{13}$ are $C_pH_{2p+1}$, where p is 1-10;
n is 1-20;
q and r are independently 1-20; and
m is 1-20.

2. The functionalized siloxane network of claim 1, wherein the pyridine-containing ligand is attached to the siloxane network through an oxygen atom or a silicon atom.

3. The functionalized siloxane network of claim 1, wherein the pyridine-containing ligand is attached to the siloxane network through a linking group derived from an alcohol functional group or an alkoxysilyl functional group.

4. The functionalized siloxane network of claim 1, wherein the siloxane network comprises a polyorgano silsesquioxane.

5. The functionalized siloxane network of claim 4, wherein the polyorgano silsesquioxane is in the form of siloxane particles.

6. The functionalized siloxane network of claim 5, wherein the siloxane particles have an average particle size of from about 0.5 microns to about 12 microns.

7. A luminophoric material comprising the functionalized siloxane network of claim 1, and a metal or metal salt coordinated by the terpyridine ligand.

8. The luminophoric material of claim 7, wherein the metal or metal salt comprises a metal chosen from europium, erbium, cerium, neodymium, samarium, terbium, dysprosium, gadolinium, holmium, thulium, ytterbium, lutetium, or a combination of two or more thereof.

9. The luminophoric material of claim 7, wherein the metal salt comprises europium nitrate.

10. An article comprising the luminophoric material of claim 7.

11. The article of claim 10, wherein the luminophoric material is provided as a coating layer on at least a portion of a surface of the article or surface of an organic or inorganic coating or as an additive into an organic or inorganic coating composition.

12. The article of claim 10, wherein the article comprises a plurality of layers, and at least one layer comprises the luminophoric material.

* * * * *